(12) United States Patent
Edwards et al.

(10) Patent No.: US 9,139,155 B2
(45) Date of Patent: Sep. 22, 2015

(54) SQUIB DRIVER DIAGNOSTIC CIRCUIT AND METHOD

(71) Applicants: William E. Edwards, Ann Arbor, MI (US); Randall C. Gray, Tempe, AZ (US)

(72) Inventors: William E. Edwards, Ann Arbor, MI (US); Randall C. Gray, Tempe, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 59 days.

(21) Appl. No.: 14/029,976

(22) Filed: Sep. 18, 2013

(65) Prior Publication Data

US 2015/0075401 A1    Mar. 19, 2015

(51) Int. Cl.
*G01R 31/28* (2006.01)
*B60R 21/264* (2006.01)
*B60R 21/017* (2006.01)

(52) U.S. Cl.
CPC ........... *B60R 21/264* (2013.01); *B60R 21/0176* (2013.01)

(58) Field of Classification Search
None
See application file for complete search history.

(56) References Cited

U.S. PATENT DOCUMENTS

| 5,309,030 | A | * | 5/1994 | Schultz ........................ 307/10.1 |
| 5,506,509 | A | * | 4/1996 | Susak ............................ 324/550 |
| 5,734,317 | A | * | 3/1998 | Bennett et al. ................ 340/436 |
| 5,805,058 | A | * | 9/1998 | Saito et al. .................... 340/436 |
| 5,977,651 | A | * | 11/1999 | Ueda et al. ................... 307/10.1 |
| 6,456,915 | B1 | * | 9/2002 | Fendt et al. .................... 701/45 |
| 7,142,407 | B2 | | 11/2006 | Sibrai |
| 2001/0009337 | A1 | * | 7/2001 | Ueno et al. ................... 307/10.1 |
| 2002/0050826 | A1 | * | 5/2002 | Boran et al. .................. 324/525 |
| 2002/0128049 | A1 | * | 9/2002 | Davis ............................ 455/572 |
| 2007/0103001 | A1 | * | 5/2007 | Chiozzi et al. ............... 307/10.1 |
| 2008/0086250 | A1 | | 4/2008 | Kuivenhoven |

\* cited by examiner

*Primary Examiner* — Mussa A Shaawat

(57) ABSTRACT

A diagnostic circuit is provided that includes a FET having a source connected to a first node, a drain, and a gate; a first switch connecting a current-supply node to one of the gate and a second node; a second switch connecting the first node and the second node; a variable current source providing one of a drive current and a test current to the current-supply node; a fire current source configured to provide a fire current to the drain; an error-detecting circuit connected to the second node, a reference terminal, and an error node, the error-detecting circuit generating an error signal to the error node indicating whether an error-detecting parameter at the second node exceeds a reference parameter at the reference terminal; and a control circuit generating control signals to control the variable current source, and the first and second switches.

20 Claims, 7 Drawing Sheets

FET TEST

GATE DRIVE CURRENT TEST

NO SQUIB TEST

SQUIB DRIVER DIAGNOSTIC CIRCUIT AND METHOD

FIELD OF THE INVENTION

The present invention relates to circuits for setting off squibs to deploy airbags in a vehicular safety device.

BACKGROUND OF THE INVENTION

Most vehicles today include a variety of safety devices. One such safety device is the airbag. Airbags are soft bags located between a driver or passenger and the vehicle in a moving direction of the vehicle the airbags are stored in a compressed format during normal operation of the vehicle. However, when the vehicle is in a crash, the airbags are rapidly inflated to provide a soft surface to cushion the impact for the driver or passenger.

When a crash occurs, the airbags must be inflated very quickly for them to be of any use. One way to achieve this rapid inflation is through the use of a squib to ignite a rapid chemical reaction that fills the air bag with gas (e.g., nitrogen, argon, or any suitable gas). In such a system, when a crash is detected, an airbag controller provides a fire current to the squib that should be sufficient to fire off the squib. It is therefore necessary to make certain that the airbag controller will provide to this fire current at the appropriate time (i.e., when a crash occurs), and that the fire current will be sufficient to detonate the squib.

It is possible, of course, to test an airbag control circuit when it is manufactured, and before installation in a vehicle. However, this neglects the possibility that the airbag control circuit may be damaged or otherwise altered during installation of the airbag system such that it was no longer capable of providing a sufficient fire current at the appropriate time. It would be more desirable to test the airbag control circuit after the airbag system was installed in the vehicle.

An additional problem with squib testing is called dudding. Dudding occurs when a current is passed through the squib that is not sufficient to detonate it, but that renders the squib unable to detonate in the future, effectively burning it out without detonating it. A typical squib used in an airbag system requires about 1.0-1.2 A to detonate. However, a lower current passed through the squib can cause dudding. A current in the range of 10 mA can safely be passed through the squib without causing dudding. Therefore, it is desirable to keep any current that passes through a squib during testing in a range of about 10 mA or lower.

It would therefore be desirable to provide an airbag control circuit that included self-diagnostic circuitry that would allow it to test itself after installation in a vehicle as to whether it can provide a sufficient fire current when needed to set off a squib in an airbag system. Furthermore, it would be desirable if this airbag test and control system did not ever pass a current through squib that was high enough to cause the squib to dud.

SUMMARY OF THE INVENTION

A driving current diagnostic circuit is provided, comprising: a field-effect transistor (FET) having a source connected to a first output node, a drain connected to a supply node, and a gate; a first switch configured to selectively connect a current supply node to one of the gate of the FET and a test node, the first switch being a single pole, double throw switch; a second switch connected between the first output node and a second output node, the second switch being a single pole, single throw switch; a test and drive current source configured to selectively provide one of a drive current and a test current to the current supply node; a fire current source configured to provide a fire current to one of the supply node and the second output node; an error-detecting circuit connected to a test node, a reference terminal, and an error node, the error-detecting circuit being configured to generated an error signal to the error node that indicates whether a value of an error-detecting parameter at the test node exceeds a value of a reference parameter at the reference terminal; and a control circuit configured to generate control signals to control operation of the test and drive current source, the first switch, and the second switch, wherein a one of the supply node and the second output node that is not connected to the fire current source is connected to a ground voltage, the test node is connected to the ground voltage.

The test and drive current source may be a variable current source capable of producing the test current and the drive current. The test and drive current source may comprise: a test current source configured to provide the test current; a third switch connected between the test current source and the current supply node, the third switch being a single pole, single throw switch; a drive current source configured to provide the drive current; and a fourth switch connected between the drive current source and the current supply node, the fourth switch being a single pole, single throw switch.

The driving current diagnostic circuit may further comprise: a capacitor having a capacitance value, wherein the test node and the one of the supply node and the second output node that is not connected to the fire current source are connected to the ground voltage through the capacitor, the error-detecting circuit is a voltage comparator, the error-detecting parameter is an error-detecting voltage, and the reference parameter is a reference voltage.

The control signals may include a test enable signal that instructs the test and drive current source to provide the test current to current supply node, and a first test selection signal that controls the operation of the first switch, the control circuit may be configured to provide the test current activation signal, and the first test selection signal, for a FET-testing duration during a test of the FET, the first switch may be configured to connect the current supply node to the gate of the FET in response to the first test selection signal, the capacitance value and the first duration may be set such that $C \cdot V_{REF} = \int_{t=0}^{T_{FT}} I_{DS}(t)dt$, $T_{FT}$ is the FET-testing duration, C is the capacitance value, $V_{REF}$ is the reference voltage, and $I_{DS}(t)$ is the drain-source current of the FET as a function of time, starting from when the fire current is first provided to the drain of the FET, and the first duration is less than the turn-on time for the FET.

In the driving current diagnostic circuit, the following equation may be true: $I_{DS}(T_{FT}) \leq I_{DUD}$, where $I_{DUD}$ is the dudding current for a squib connected between the first and second output nodes.

The control signals may include a drive current activation signal that instructs the test and drive current source to provide the drive current to the gate of the FET, the control circuit is configured to provide the drive current activation signal, and a second test selection signal, for a drive-current-testing duration during a test of the gate drive current, the first switch may be configured to connect the current supply node to the second output node in response to the second test selection signal, the drive-current-testing duration may be set such that $C \cdot V_{REF} = T_{DCT} \cdot I_{DRIVE-TEST}$, where $T_{DCT}$ is the drive-current-testing duration, and $I_{DRIVE-TEST}$ is a minimum acceptable drive current.

The control signals may include a continuity enable signal that controls the operation of the second switch, the control circuit may be configured to provide the drive current activation signal, the first test selection signal, and the continuity enable signal for a fire-current-testing duration during a test of the fire current, the second switch may be configured to be closed in response to the continuity enable signal, the third duration may be set such that $C \cdot V_{REF} = T_{FCT} \cdot I_{FIRE\text{-}TEST}$, where $T_{FCT}$ is the fire-current-testing duration, and $I_{FIRE\text{-}TEST}$ is a minimum acceptable fire current after the FET has turned on, and the fire-current-testing duration may be longer than the activation time of the FET.

The driving current diagnostic circuit may be part of an airbag deployment system in a vehicle, the control circuit may be configured to receive a crash signal, indicating that the vehicle has been in a crash, the control circuit may be configured to provide the drive current activation signal and the first test selection signal for an activation duration after it receives the crash signal, and the activation duration may be longer than the activation time of the FET.

The error-detecting circuit may be a current comparator, the error-detecting parameter may be an error-detecting current, and the reference parameter may be a reference current.

An air bag deployment system for a vehicle is provided, comprising: a squib configured to fire when it receives a fire current; an undeployed air bag configured to deploy when the squib fires; and a fire current supply circuit, including a field-effect transistor (FET) having a source connected to a first output node, a drain connected to a supply node, and a gate; a first switch configured to selectively connect a current supply node to one of the gate of the FET and a test node, the first switch being a single pole, double throw switch; a second switch connected between the first output node and a second output node, the second switch being a single pole, single throw switch; a test and drive current source configured to selectively provide one of a drive current and a test current to the current supply node; a fire current source configured to provide a fire current to one of the supply node and the second output node; an error-detecting circuit connected to a test node, a reference terminal, and an error node, the error-detecting circuit being configured to generated an error signal to the error node that indicates whether a value of an error-detecting parameter at the test node exceeds a value of a reference parameter at the reference terminal; and a control circuit configured to generate control signals to control operation of the test and drive current source, the first switch, and the second switch, wherein a one of the supply node and the second output node that is not connected to the fire current source is connected to a ground voltage, the test node is connected to the ground voltage, and the squib is connected between the first output node and the second output node.

The test and drive current source may be a variable current source capable of producing the test current and the drive current. The test and drive current source may comprise: a test current source configured to provide the test current; a third switch connected between the test current source and the current supply node, the third switch being a single pole, single throw switch; a drive current source configured to provide the drive current; and a fourth switch connected between the drive current source and the current supply node, the fourth switch being a single pole, single throw switch.

The air bag deployment system may further comprise: a capacitor having a capacitance value, wherein the test node and the one of the supply node and the second output node that is not connected to the fire current source are connected to the ground voltage through the capacitor, the error-detecting circuit is a voltage comparator, the error-detecting parameter is an error-detecting voltage, and the reference parameter is a reference voltage.

The control signals may include a test enable signal that instructs the test and drive current source to provide the test current to current supply node, and a first test selection signal that controls the operation of the first switch, the control circuit may be configured to provide the test current activation signal, and the first test selection signal, for a FET-testing duration during a test of the FET, the first switch may be configured to connect the current supply node to the gate of the FET in response to the first test selection signal, the capacitance value and the first duration may be set such that $C \cdot V_{REF} = \int_{t=0}^{T_{FT}} I_{DS}(t)dt$, $T_{FT}$ is the FET-testing duration, C is the capacitance value, $V_{REF}$ is the reference voltage, and $I_{DS}(t)$ is the drain-source current of the FET as a function of time, starting from when the fire current is first provided to the drain of the FET, and $T_{FT}$ is less than the turn-on time for the FET.

The control signals may include a drive current activation signal that instructs the test and drive current source to provide the drive current to the gate of the FET, and a continuity enable signal that controls the operation of the second switch, the control circuit may be configured to provide the drive current activation signal, the test selection signal, and the continuity enable signal for a second duration during a test of the gate drive current, during the second duration, the test selection signal may instruct the first switch to connect the current supply node to the second output node, and the continuity enable signal instructs the second switch to be closed, the second duration may be set such that $C \cdot V_{REF} = T_2 \cdot I_{DRIVE}$, where $T_2$ is the second duration, and $I_{DRIVE}$ is a minimum acceptable drive current.

The control circuit may be configured to receive a crash signal, indicating that the vehicle has been in a crash, the control circuit may be configured to provide the drive current activation signal, and the test selection signal for a fourth duration after it receives the crash signal, during the fourth duration, the test selection signal may instruct the first switch to connect the current supply node to the gate of the FET, and the fourth duration may be longer than the activation time of the FET.

The error-detecting circuit may be a current comparator, the error-detecting parameter may be an error-detecting current, and the reference parameter may be a reference current.

A method of testing and operating a squib detonation circuit for an air bag system in a vehicle is provided, the circuit containing first and second squib connectors configured to connect to a squib, and a field effect transistor (FET) connected at its drain to a supply node and at its source to the first squib connector, the method comprising: connecting the squib to the first and second squib connectors during a first duration; providing a test current to a gate of the FET during the first duration; determining whether a first error-detecting parameter at a test node is greater than a reference parameter at the end of the first duration; and sending a first error signal indicating failure of the FET if the first error-detecting parameter at the second squib connector is not determined to be greater than the reference parameter at the end of the first duration; providing a drive current to the second squib connector during a second duration; determining whether a second error-detecting parameter at the second squib connector is greater than the reference parameter at the end of the second duration; and sending a second error signal indicating failure of a drive current source if the second error-detecting parameter at the second squib connector is not determined to be greater than the reference parameter at the end of the second duration, wherein one of the supply node and the second squib connector is connected to a fire current supply, a one of the supply node and the second squib connector that is not connected to the fire current supply is connected to a ground voltage, the test node is connected to the ground voltage, and the first duration is shorter than the turn-on time of the FET.

The method may further comprise: placing the first and second squib connectors in an unconnected state during a third duration; providing the drive current to the gate of the FET during the third duration; electrically connecting the first squib connector and the second squib connector during the third duration; determining whether a third error-detecting parameter at the second squib connector is greater than the reference parameter at the end of the third duration; and sending a third error signal indicating failure of the fire current source if the third error-detecting parameter at the second squib connector is not determined to be greater than the reference parameter at the end of the third duration, wherein the third duration is greater than or equal to the activation time of the FET.

The method may further comprise: connecting the squib to the first and second squib connectors during operation of the vehicle; receiving a fire signal indicating that the squib should be fired; and providing the drive current to the gate of the FET in response to the fire signal for a fourth duration, wherein the fourth duration is after the first, second, and third durations, and the fourth duration is longer than the turn-on time of the FET.

The first error-detecting parameter may be a first error-detecting voltage, the second error-detecting parameter may be a second error-detecting voltage, and the reference parameter may be a reference voltage. Alternately, the first error-detecting parameter may be a first error-detecting current, the second error-detecting parameter may be a second error-detecting current, and the reference parameter may be a reference current.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. Embodiments of the invention are defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, may be supported with or in integrated circuits (ICs), such as dynamic random access memory (DRAM) devices, static random access memory (SRAM) devices, or the like. In particular, they may be implemented using CMOS transistors. It is expected that one of ordinary skill, notwithstanding possibly significant effort and many design choices motivated by, for example, available time, current technology, and economic considerations, when guided by the concepts and principles disclosed herein will be readily capable of generating such ICs without undue experimentation. Therefore, in the interest of brevity and minimization of any risk of obscuring the principles and concepts according to the present invention, further discussion of such ICs will be limited to the essentials with respect to the principles and concepts used by the exemplary embodiments.

Air Bag System

Figure 1:
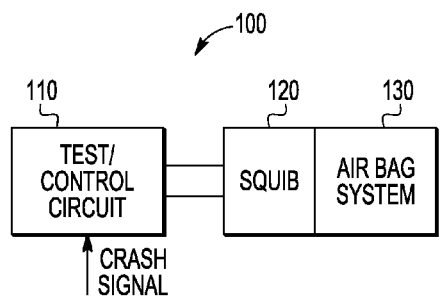
FIG. 1 is a block diagram of an air bag system according to disclosed embodiments.

FIG. 1 is a block diagram of an air bag system 100 according to disclosed embodiments. As shown in FIG. 1, the air bag system includes a test/control circuit 110, a squib 120, and an air bag 130.

The test/control circuit 110 operates to provide a signal of sufficient current to the squib 120 that the squib will detonate. In addition, the test/control circuit 110 also operates to test itself to determine that it is in functional order, but does so without setting off the squib 120, and without dudding the squib.

The squib 120 is an explosive element configured to detonate when a signal of sufficient current is passed through it.

The air bag 130 is a conventional airbag in a vehicle (e.g., an automobile), used to protect a driver or passenger in the vehicle. The airbag 130 is configured to be deployed during a crash. To this end, the vehicle includes a crash determination element (not shown) that determines whether the vehicle is in a crash, and provides a crash signal to the test/control circuit 110 when the vehicle is in a crash.

The test/control circuit 110 then provides a signal to the squib 120 that should be sufficient to cause the squib to explode. The exploding squib 120 then causes the airbag 130 to deploy.

In operation, it is important that the squib 120 be properly triggered during a crash. It is therefore necessary to test the control portion of the test/control circuit 110 to make certain that it is functioning properly. However, this must be done such that the squib 120 is not prematurely discharged or dudded. As a result, diagnostic circuitry is included in the test/control circuit 110.

Test/Control Circuit

Figure 2:
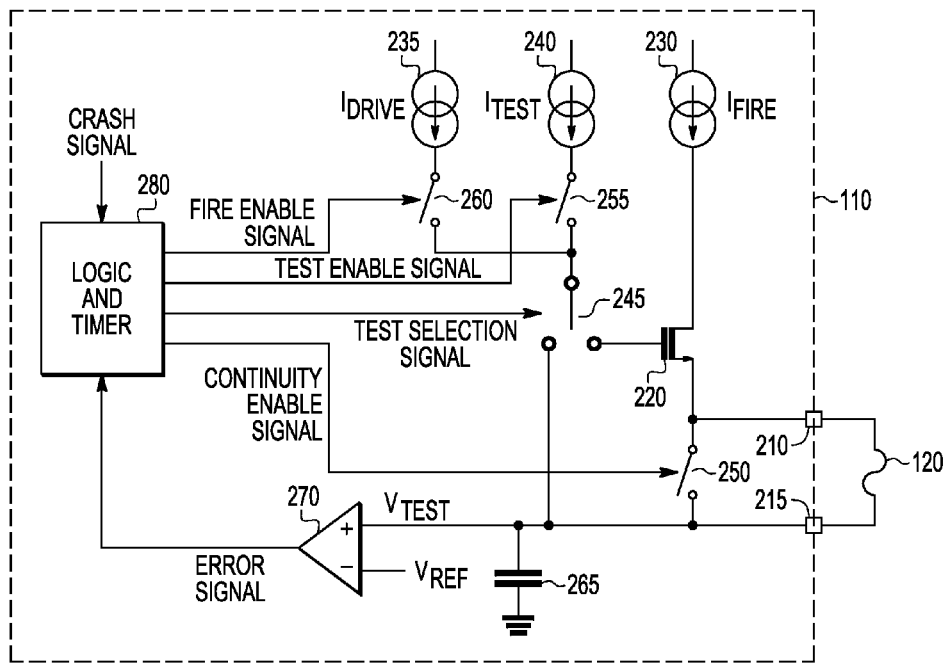
FIG. 2 is a block diagram of the test control circuit of FIG. 1 according to disclosed embodiments.

FIG. 2 is a block diagram of the test/control circuit 110 of FIG. 1 according to disclosed embodiments. As shown in FIG. 2, the test/control circuit 110 includes a first output terminal 210, a second output terminal 215, a firing field-effect transistor (FET), 220, a fire current source 230, a drive current source 235, a test current source 240, a first switch 245, a second switch 250, a third switch 255, a fourth switch 260, a capacitor 265, an error-detecting circuit 270, and a logic and timer circuit 280. The test/control circuit 110 is connected to the squib 120 at the first and second output notes 210, 215.

It should be noted that FIG. 2 depicts a high-side switch, in which a firing FET 220 is used only on the higher voltage side of the squib 120 (i.e., between the fire current source 230 and the squib 120). However, one of skill in the art would understand that the same concept would apply to a low-side switch, in which a firing FET is used on the lower voltage side of the squib 120 (i.e., between ground and the squib 120).

The squib 120 is connected between the first and second output terminals 210, 215 and is configured to explode when a proper fire current $I_{FIRE}$ is provided to the squib 120.

The first and second output terminals 210, 215 can be any sort of input/output element to which the squib 120 can be connected.

The firing FET 220 has a source, a drain, and a gate. The source of the firing FET 220 is connected to the first output terminal 210. In this disclosed embodiment, the firing FET 220 is an N-channel metal oxide semiconductor field-effect transistor (MOSFET), though other types of FET could be used in alternate embodiments. The firing FET 220 is used as a switch to provide the fire current $I_{FIRE}$ to the squib 120.

The fire current source 230 provides fire current $I_{FIRE}$ to the drain of the firing FET 220. As noted above, the fire current $I_{FIRE}$ in a functioning test/control circuit 110 should be sufficient to cause the squib 120 to fire.

The drive current source 235 provides a drive current $I_{DRIVE}$ to a first terminal of the fourth switch 260 when a crash is detected. The drive current $I_{DRIVE}$ in a functioning test/control circuit 110 should be sufficient to turn the firing FET 220 fully on, allowing the fire current $I_{FIRE}$ to pass to the squib 120

The test current source 240 provides a test current $I_{TEST}$ to a first terminal of the third switch 255. The test current $I_{TEST}$ is used in a testing operation of the test/control circuit 110, as will be described below. In the disclosed embodiments, the test current $I_{TEST}$ is a known current that is lower than the drive current $I_{DRIVE}$.

The first switch 245 is a single pole, double throw switch that connects a current supply node $N_C$ with either the gate of the firing FET 220 or a testing terminal of the error-detecting circuit 270 based on a test selection signal.

The second switch 250 is a single pole, single throw switch connected between the source of the firing FET 220 and the testing node of the error-detecting circuit 270. The second switch 250 is opened and closed based on a continuity enable signal.

The third switch 255 is a single pole, single throw switch that has its first terminal connected to the test current source 240, and its second terminal connected to the current supply node $N_C$. The third switch 255 is opened and closed based on a test enable signal.

The fourth switch 260 is a single pole, single throw switch that has its first terminal connected to the drive current source 235 and its second terminal connected to the current supply node $N_C$ the fourth switch 260 is opened and closed based on a fire enable signal.

The capacitor 265 is connected between the second output terminal 215, and ground, and operates to accumulate charge at the testing terminal of the error-detecting circuit 270 that can be measured by the error-detecting circuit 270. The capacitor 265 has a known capacitance of $C_K$.

The error-detecting circuit 270 is a voltage comparator that operates to compare a test voltage $V_{TEST}$ at a testing terminal with a reference voltage $V_{REF}$ at a reference terminal. The testing terminal is connected to the second output terminal 215 (and thus to the capacitor 265), while the reference terminal is connected to the reference voltage $V_{REF}$. The error-detecting circuit 270 provides an error signal which indicates whether or not the test voltage $V_{TEST}$ exceeded the reference voltage $V_{REF}$.

The logic and timer circuit 280 receives the error signal from the error-detecting circuit 270 and the crash signal from the crash determination element, and generates the fire enable signal, the test enable signal, the test selection signal, and the continuity enable signal. The logic and timer circuit 280 is capable of measuring time either through an internal clock or a received clock signal.

During a test process, the logic and timer circuit 280 determines whether the test/control circuit 110 is in proper working order based on the status of its various input and output signals. During normal operation, the logic and timer circuit 280 functions to provide the fire current $I_{FIRE}$ to the squib 120 when the crash determination element determines that the vehicle is in a crash.

Operation of the Firing FET

Figure 3:
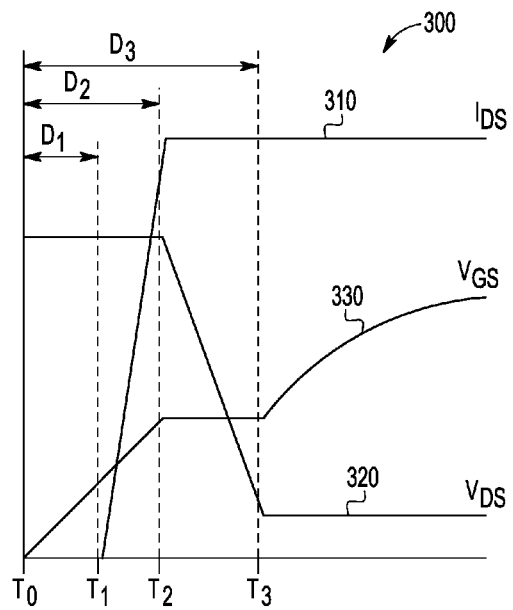
FIG. 3 is a graph of the operation of the firing FET of FIG. 2 according to disclosed embodiments.

FIG. 3 is a graph of the operation of the firing FET 220 of FIG. 2 according to disclosed embodiments. In particular, FIG. 3 is a gate charge curve for the firing FET that shows graphs of the drain-source current $I_{DS}$ versus time 310, the drain-source voltage $V_{DS}$ versus time 320, and the gate-source voltage $V_{GS}$ versus time 330. The meaning of this graph would be understood by one of ordinary skill in the relevant art.

As shown in FIG. 3, if the firing FET 220 is turned on at time $T_0$, the drain-source current $I_{DS}$ will not begin to rise until a time $T_1$, and will not reach its full value until a time $T_2$. Thus, during a first duration between time $T_0$ and time $T_2$, the firing FET 220 will not be passing to the source the full current available at the drain. In the test/control circuit 110 of FIG. 2, this means that up until the time $T_2$, the firing FET 220 does not provide the full fire current $I_{FIRE}$ to the first output terminal 210.

The drain-source voltage $V_{DS}$ remains constant until time $T_2$, when the drain-source current $I_{DS}$ is at its maximum. At this point, the drain-source voltage $V_{DS}$ falls linearly from its maximum value to a minimum value at time $T_3$.

The gate-source voltage $V_{GS}$ starts at zero at time $T_0$, rises linearly to an intermediate value at time $T_2$, where it remains from time $T_2$ until time $T_3$, at which time it rises asymptotically toward its maximum value.

Circuit Testing and Operation

In order for the test/control circuit 110 to function properly during normal operation, it must be able to provide a fire current $I_{FIRE}$ of sufficient strength to fire the squib 120 during a crash condition. In order to ensure that this occurs, the test/control circuit 110 determines three different things during testing. First, it determines whether the firing FET 220 is properly functioning such that it can pass the fire current $I_{FIRE}$ to the squib 120. Second, it determines whether the drive current $I_{DRIVE}$ is sufficient to turn on the firing FET 220. Third, it determines whether the fire current $I_{FIRE}$ is sufficient to set off the squib 120. Thus, the test/control circuit 110 can function in four different modes: a FET-testing mode, a drive-current-testing mode, a fire-current-testing mode, and an operational mode.

Figure 4:
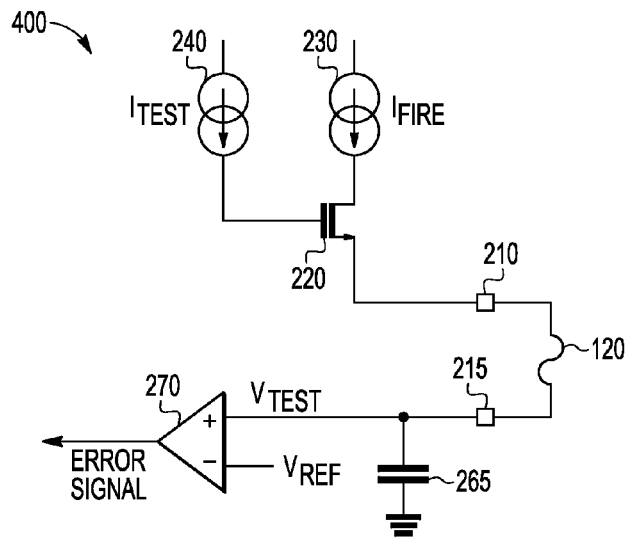
FIG. 4 is a circuit diagram of a first effective circuit configuration of the test/control circuit of FIG. 2 during a FET-testing mode according to disclosed embodiments.
Figure 5:
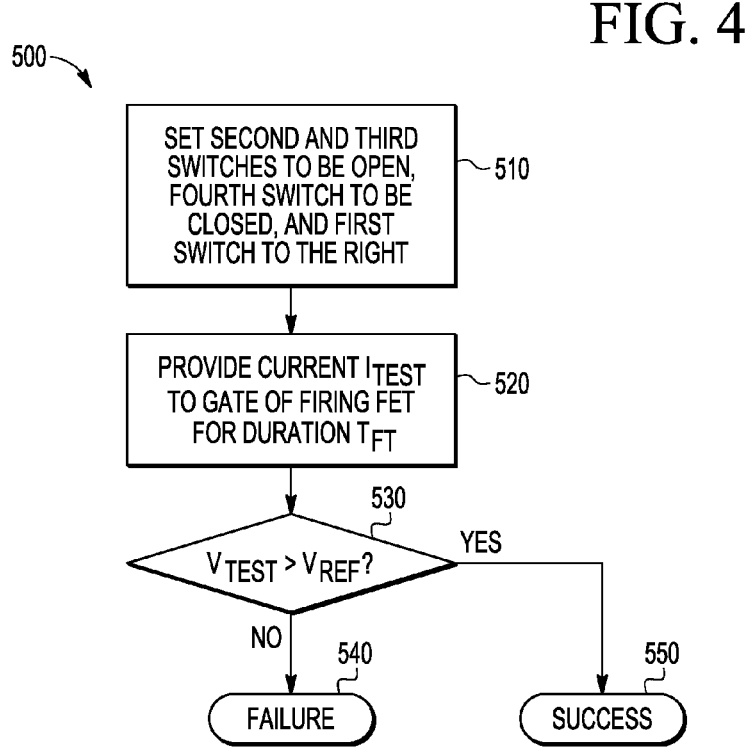
FIG. 5 is a flow chart of the operation of the test/control circuit of FIG. 2 during a FET-testing process according to disclosed embodiments.
Figure 6:
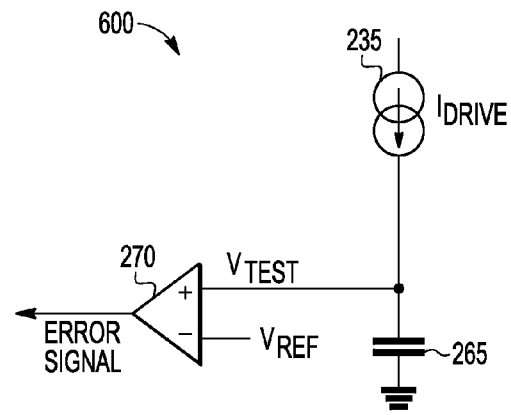
FIG. 6 is a circuit diagram of a second effective circuit configuration of the test/control circuit of FIG. 2 during a drive-current-testing mode according to disclosed embodiments.
Figure 7:
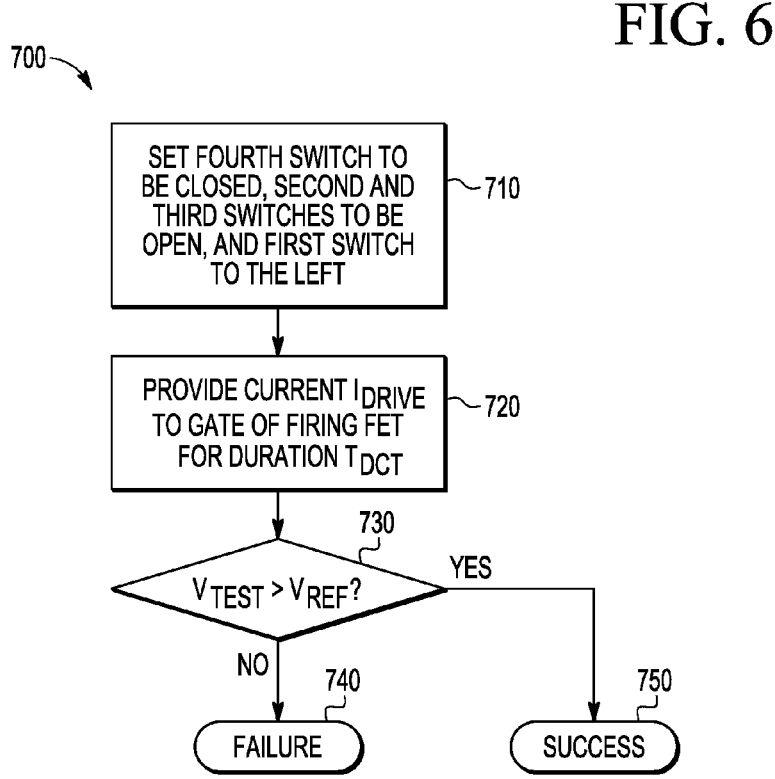
FIG. 7 is a flow chart of the operation of the test/control circuit of FIG. 2 during a drive-current-testing process according to disclosed embodiments.
Figure 8:
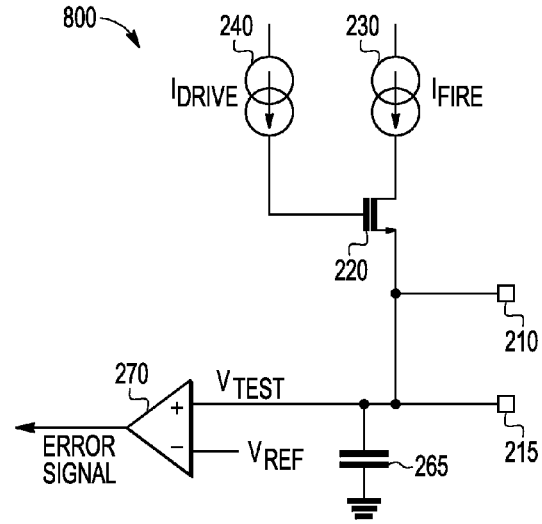
FIG. 8 is a circuit diagram of a third effective circuit configuration of the test/control circuit of FIG. 2 during a fire-current-testing mode according to disclosed embodiments.
Figure 9:
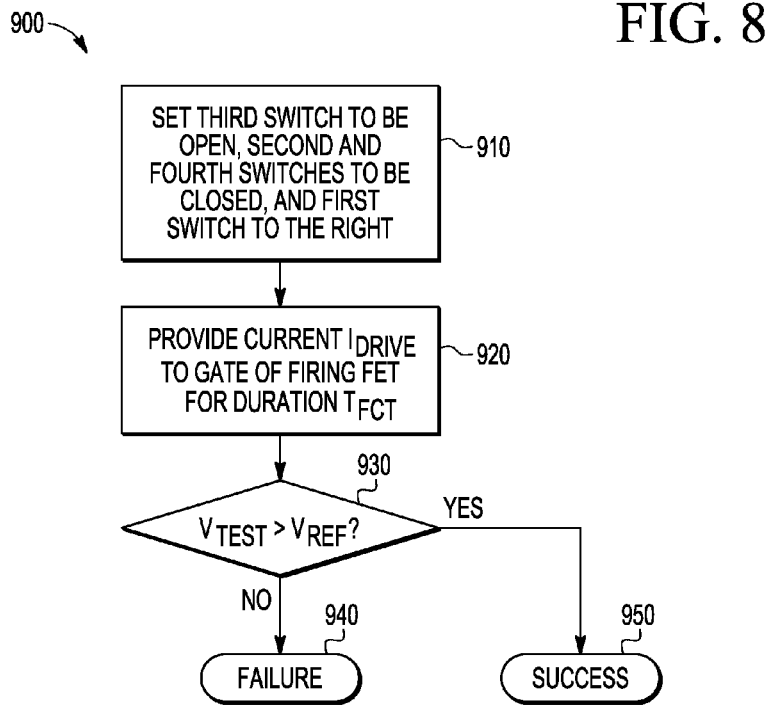
FIG. 9 is a flow chart of the operation of the test/control circuit of FIG. 2 during a fire-current-testing process according to disclosed embodiments.

FIGS. 4-11 illustrate these four modes. In particular, FIGS. 4 and 5 describe the FET-testing mode; FIGS. 6 and 7 describe the drive-current-testing mode; FIGS. 8 and 9 describe the fire-current-testing mode; and FIGS. 10 and 11 describe the operational mode. FIGS. 4, 6, 8, and 10 each show effective circuit configurations of the test/control circuit of FIG. 2 during a corresponding mode. In these effective circuit configurations, a closed circuit is simply shown as a connection line, while an open circuit is shown as a disconnected line. Any elements that are isolated from the main functioning circuit are not shown in the effective circuit configuration. The logic and timer circuit 280 is also not shown in these effective circuit configurations, though the logic and timer circuit 280 still receives the error signal and the crash signal, and provides the fire enable signal, the test enable signal, the test selection signal, and the continuity enable signal.

FET-Testing Mode

FIG. 4 is a circuit diagram of a first effective circuit configuration of a test/control circuit of FIG. 2 during the FET-testing mode according to disclosed embodiments, while FIG. 5 is a flow chart of the operation of the test/control circuit of FIG. 2 during a FET testing process 500 according to disclosed embodiments. During the FET-testing process 500, the squib 120 should be connected to the first and second output terminals 210, 215.

In the FET-testing mode, the test selection signal instructs the first switch 245 to connect the current supply node $N_C$ to the gate of the firing FET 220; the continuity enable signal instructs the second switch 250 to be open; the test enable signal instructs the third switch 255 to be closed; and the fire enable signal instructs the fourth switch 260 to be open. As shown in FIG. 4 this provides a circuit in which the test current source 240 is connected to the gate of the firing FET 220, the source of the firing FET 220 is connected to the first output terminal 210, the drive current source 235 is isolated from the main functioning circuit, and the first and second output terminals 210, 215 are connected by the squib 120.

As shown in FIG. 5, an FET-testing process 500 begins when the first switch is set to connect the current supply node $N_C$ to the gate of the firing FET 220), the second switch is set to be open (i.e., leaving the first and second output terminals not shorted out), the third switch is set to be closed (i.e., connecting the test current source 240 to the current supply node $N_C$), and the fourth switch is set to be open (i.e., isolating the drive current supply 235 from the current supply node $N_C$) (510). This configuration places the test/control circuit 110 in the FET-testing mode, and will provide an effective circuit configuration as shown in FIG. 4. In the disclosed embodiment, this configuration can be achieved by sending the appropriate fire enable signal, test enable signal, test selection signal, and continuity enable signal from the logic and timer circuit 280.

Once the switches are properly set for the FET-testing mode, a test current $I_{TEST}$ is then provided to the gate of the firing FET 220 for a FET-testing time $T_{FT}$ (520). This test current $I_{TEST}$ will begin to turn the firing FET 220 on. As this happens, current from the fire current supply 230 will begin to pass through the FET 230 and the squib 120, and will accumulate at the capacitor 265, creating the test voltage $V_{TEST}$ at the test voltage terminal of the error-detecting circuit 270.

Once the test current $I_{TEST}$ has been provided to the gate of the firing FET for the FET-testing time $T_{FT}$, the process 500 determines whether a test voltage $V_{TEST}$ at the testing terminal of the error-testing circuit 270 is greater than the reference voltage $V_{REF}$ at the reference terminal of the error-testing circuit 270 (530).

If the test voltage $V_{TEST}$ is not greater than the reference voltage $V_{REF}$, then the FET test is considered a failure (540), since the firing FET 220 does not pass the proper amount of current to successfully fire the squib 120.

If, however, the test voltage $V_{TEST}$ is greater than the reference voltage $V_{REF}$ (570), then the FET test is considered a success (550), since the firing FET 220 passes sufficient current fire the squib 120.

The value of the test current $I_{TEST}$ is selected to be lower than the drive current $I_{DRIVE}$ so that the firing FET 220 is not fully turned on, and so does not pass the full fire current $I_{FIRE}$. In this way, the operation of the firing FET 220 can be tested without the danger of the squib 120 being dudded. In particular, this prevents the current passing through the firing FET 220 from rising above a threshold of danger for dudding (e.g., 10 mA).

The value of the FET-testing time $T_{FT}$ is selected based on the known values of the test current $I_{TEST}$, the capacitance C of the capacitor 265, and the reference voltage $V_{REF}$.

It is known that accumulated charge is equal to current multiplied by time, i.e., $$Q = I \times T \quad (1)$$

where Q is charge, I is current, and T is time.

It is also known that the charge held on a capacitor is equal to the capacitor's capacitance multiplied by the voltage across the capacitor, i.e., $$Q = C \times V \quad (2)$$

where Q is charge, C is capacitance, and V is voltage.

Thus, when Equations (1) and (2) are combined, it can be shown that for a capacitor C charged by a current I over a time T to gain a voltage V across the capacitor:

$$I \times T = C \times V. \quad (3)$$

Solving for time, gives the following equation:

$$T = \frac{C \times V}{I} \quad (4)$$

Therefore, with a known reference voltage $V_{REF}$, a known capacitance $C_K$, and a desired FET-testing current $I_{FT}$, it is possible to set the FET-testing time $T_{FT}$ to be:

$$T_{FT} = \frac{C_K \times V_{REF}}{I_{FT}} \quad (5)$$

In this way, the desired FET-test current $I_{FT}$ can be kept below the threshold of danger for dudding the squib 120 (e.g., 10 mA).

Referring to FIG. 3, it is desirable to pick the known capacitance $C_K$ such that $T_{FT}$ is between times $T_1$ and $T_2$.

In this way, it is possible to test the operation of the firing FET 220 without passing so much current through the FET that there is a danger of dudding the squib 120.

It should be noted, however, that while this circuit and method is designed so that the firing FET 220 can be tested with the squib connected, such a test can also be performed with the squib disconnected. All that is required in that case is to instruct the second switch 250 to be closed rather than open to provide the fire current $I_{FIRE}$ a path to the capacitor 265.

Drive-Current-Testing Mode

FIG. 6 is a circuit diagram of a second effective circuit configuration of a test/control circuit of FIG. 2 during drive-current-testing mode according to disclosed embodiments, while FIG. 7 is a flow chart of the operation of the test/control circuit of FIG. 2 during a drive current testing process 700 according to disclosed embodiments. During the drive-current-testing process 700, it is irrelevant whether or not the squib 120 is connected to the first and second output terminals 210, 215.

In the drive-current-testing mode, the test selection signal instructs the first switch 245 to connect the current supply node $N_C$ to the testing terminal of the error-detection circuit 270; the continuity enable signal instructs the second switch 250 to be open; the test enable signal instructs the third switch 255 to be open; and the fire enable signal instructs the fourth switch 260 to be closed. As shown in FIG. 6 this provides a circuit in which the drive current source 240 is connected to the testing terminal of the error-detection circuit 270. Furthermore, the firing FET 220 and the test current source 235 are both isolated from the main functioning circuit. The firing FET 220 is shut off, thus isolating the fire current source 230 from the main functioning circuit.

As shown in FIG. 7, a drive-current-testing process 700 begins when the first switch is set to the left (i.e., connecting the current supply node $N_C$ to the testing terminal of the error-detecting circuit 270), the second switch is set to be open (i.e., leaving the first and second output terminals not shorted out), the third switch is set to be open (i.e., isolating the test current source 240 from the current supply node $N_C$), and the fourth switch is set to be closed (i.e., connecting the drive current supply 235 to the current supply node $N_C$) (710). This places the test/control circuit 110 in the drive-current-testing mode, and will provide an effective circuit configuration as shown in FIG. 6. In the disclosed embodiment, this configuration can be achieved by sending the appropriate fire enable signal, test enable signal, test selection signal, and continuity enable signal from the logic and timer circuit 280.

Once the switches are properly set for the drive-testing mode, the drive current $I_{DRIVE}$ is then provided to the testing terminal of the error-detecting circuit 270 for a drive-current-testing time $T_{DCT}$ (720). As this happens, current from the drive current supply 230 will begin to accumulate at the capacitor 265, creating the test voltage $V_{TEST}$ at the test voltage terminal of the error-detecting circuit 270.

Once the drive current $I_{DRIVE}$ is then provided to the testing terminal of the error-detecting circuit 270 for the drive-current-testing time $T_{DCT}$, the operation determines whether the test voltage $V_{TEST}$ is greater than the reference voltage $V_{REF}$ (730)

If the test voltage $V_{TEST}$ is not greater than the reference voltage $V_{REF}$, then the drive current test is considered a failure (740), since current passed through the firing FET 220 at a time $T_{DCT}$ is not high enough to fully turn on the firing FET 220.

If, however, the test voltage $V_{TEST}$ is greater than the reference voltage $V_{REF}$, then the drive current test is considered a success (750), since the current passed through the firing FET 220 (i.e., $I_{DRIVE}$) is high enough to fully turn on the firing FET 220.

A goal of the drive-current-testing operation 700 is to determine whether the actual drive current $I_{DRIVE}$ is sufficiently high to turn on the firing FET 220. Using Equation (4), with a known reference voltage $V_{REF}$, a known capacitance $C_K$, and a desired drive current $I_{DRIVE-TEST}$, for the drive test, it is possible to set the drive-current-testing time $T_{DCT}$ accordingly:

$$T_{DCT} = \frac{C_K \times V_{REF}}{I_{DRIVE-TEST}} \quad (4)$$

Using this value of $T_{DCT}$, if the actual drive current $I_{DRIVE}$ is equal to or greater than the desired drive current $I_{DRIVE-TEST}$ then it will provide sufficient charge to the capacitor 265 over the drive-current-testing time $T_{DCT}$ that the test voltage $V_{TEST}$ should be equal to or greater than the reference voltage $V_{REF}$, which is exactly what the drive-current-testing operation 700 tests for to determine a successful drive-current test.

The capacitance $C_K$ of the capacitor 265 is chosen such that the drive-current-testing time $T_{DCT}$ is greater than or equal to the time $T_2$ from FIG. 3. In other words, the drive-current-testing time $T_{DCT}$ is chosen such that a maximum drain-to-source current $I_{DS}$ is passed through the firing FET 220 at the drive-current-testing time $T_{DCT}$.

Although this operation is described as a way of testing the drive current $I_{DRIVE}$, it can also be used to test the test current $I_{TEST}$. All that is necessary is to set the third switch 255 to be closed and the fourth switch 260 to be open, and the time that the test current $I_{TEST}$ is applied to the capacitor to be an appropriate test-current-testing current $T_{TCT}$. In this way, the test current $I_{TEST}$ will be provided to the capacitor 265 for a test-current-testing current $T_{TCT}$ sufficient to bring the test voltage $V_{TEST}$ to be equal to or greater than the reference voltage $V_{REF}$.

Fire-Current-Testing Mode

FIG. 8 is a circuit diagram of a third effective circuit configuration of a test/control circuit of FIG. 2 during the fire-current-testing mode according to disclosed embodiments, while FIG. 9 is a flow chart of the operation of the test/control circuit of FIG. 2 during a fire-current-testing process 900 according to disclosed embodiments. During the fire-current-testing process 900, the squib 120 should be disconnected from the first and second output terminals 210, 215. In order to eliminate the risk of dudding the squib 120 or accidentally detonating the squib 120, this fire-current testing is preferably performed prior to connecting the squib 120 to the test/control circuit 110.

In the fire-current-testing mode, the test selection signal instructs the first switch 245 to connect the current supply node $N_C$ to the gate of the firing FET 220; the continuity enable signal instructs the second switch 250 to be closed; the test enable signal instructs the third switch 255 to be open;

and the fire enable signal instructs the fourth switch 260 to be closed. As shown in FIG. 8 this provides a circuit in which the drive current source 235 is connected to the gate of the firing FET 220, the source of the firing FET 220 is connected to the testing terminal of the error-detection circuit 270, the drive current source 235 is isolated from the main functioning circuit, and the first and second output terminals 210, 215 are shorted.

As shown in FIG. 9, a fire-current-testing process 900 begins when the first switch is set to the right (i.e., connecting the current supply node $N_C$ to the gate of the firing FET 220), the second switch is set to be closed (i.e., connecting the first and second output terminals), the third switch is set to be open (i.e., isolating the test current source 240 from the current supply node $N_C$), and the fourth switch is set to be closed (i.e., connecting the drive current supply 235 to the current supply node $N_C$) (910). This places the test/control circuit 110 in the fire-current-testing mode, and will provide an effective circuit configuration as shown in FIG. 8. In the disclosed embodiment, this configuration can be achieved by sending the appropriate fire enable signal, test enable signal, test selection signal, and continuity enable signal from the logic and timer circuit 280.

Once the switches are properly set for the fire-current-testing mode, the drive current $I_{DRIVE}$ is then provided to the gate of the firing FET 220 for a fire-current-testing time $T_{FCT}$ (920). This drive current $I_{DRIVE}$ will begin to turn on the firing FET 220. As this happens, current from the fire current supply 230 will begin to pass through the firing FET 220 from its drain to its source, and will accumulate at the capacitor 265, creating the test voltage $V_{TEST}$ at the test voltage terminal of the error-detecting circuit 270.

The fire-current-testing process 900 then determines whether or not a test voltage $V_{TEST}$ at the testing terminal of the error-testing circuit 270 is greater than the reference voltage $V_{REF}$ at the reference terminal of the error-testing circuit 270 (930).

If the test voltage $V_{TEST}$ is determined to be less than the reference voltage $V_{REF}$ (550), the fire-current test is considered a failure (940) since the fire current $I_{FIRE}$ passing through the firing FET 220 is too small to properly set off the squib 120.

If, however, the test voltage $V_{TEST}$ is greater than or equal to the reference voltage $V_{REF}$, then the fire-current test is considered a success (950), since the fire current $I_{FIRE}$ is high enough to properly set off the squib 120.

A goal of the fire-current-testing operation 900 is to determine whether the fire current $I_{FIRE}$ is sufficiently high to fire the squib 120. Using Equation (4), with a known reference voltage $V_{REF}$, a known capacitance $C_K$, and a desired fire-test current $I_{FIRE-TEST}$, it is possible to set the fire-current-testing time $T_{FCT}$ accordingly:

$$T_{FCT} = \frac{C_K \times V_{REF}}{I_{FIRE-TEST}} \quad (4)$$

Using this value of $T_{FCT}$, if the actual fire current $I_{FIRE}$ is equal to the desired fire current $I_{FIRE-TEST}$ then, when the fire-current-testing operation 900 reaches the fire-current-testing time $I_{FCT}$, the test voltage $V_{TEST}$ should be equal to the reference voltage $V_{REF}$, which is exactly what the fire-current-testing operation 900 tests for to determine a successful fire-current test.

Normal Operation Mode

Figure 10:
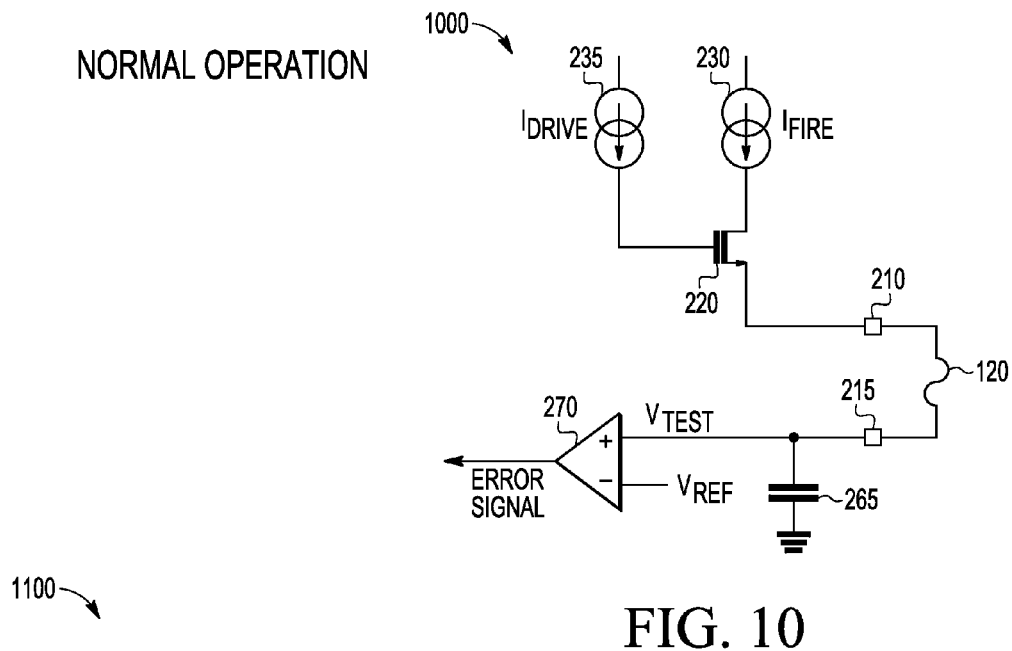
FIG. 10 is a circuit diagram of a fourth effective circuit configuration of the test/control circuit of FIG. 2 during an airbag deployment mode according to disclosed embodiments.
Figure 11:
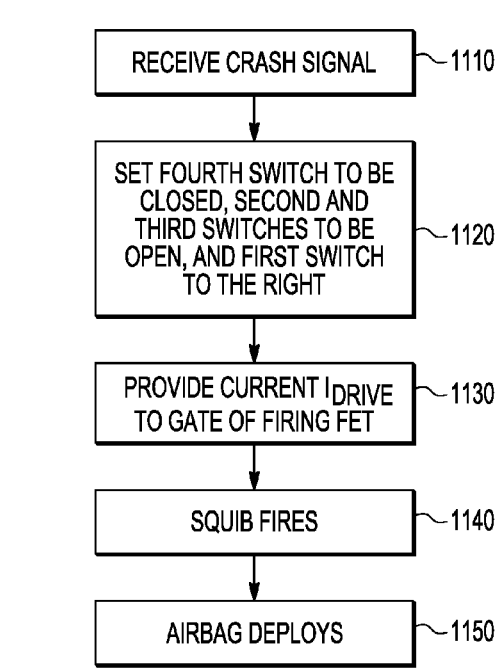
FIG. 11 is a flow chart of the operation of the test/control circuit of FIG. 2 during an airbag deployment process according to disclosed embodiments.

FIG. 10 is a circuit diagram of a fourth effective circuit configuration of a test/control circuit of FIG. 2 during an airbag deployment mode according to disclosed embodiments, while FIG. 11 is a flow chart of the operation of the test/control circuit of FIG. 2 during an airbag deployment process 1100 according to disclosed embodiments. During the airbag deployment process 1100, the squib 120 should be connected to the first and second output terminals 210, 215.

In the airbag deployment mode, the test selection signal instructs the first switch 245 to connect the current supply node $N_C$ to the gate of the firing FET 220; the continuity enable signal instructs the second switch 250 to be open; the test enable signal instructs the third switch 255 to be open; and the fire enable signal instructs the fourth switch 260 to be closed. As shown in FIG. 10 this provides a circuit in which the drive current source 240 is connected to the gate of the firing FET 220, the source of the firing FET 220 is connected to the first output terminal 210, the test current source 235 is isolated from the main functioning circuit, and the first and second output terminals 210, 215 are connected by the squib 120.

As shown in FIG. 11, the airbag deployment process 1100 begins when the logic and timer circuit 280 receives a crash signal indicating that a crash has been detected (1110).

Once the crash signal is received, then the first switch is set to the right (i.e., connecting the current supply node $N_C$ to the gate of the firing FET 220), the second switch is set to be open (i.e., leaving the first and second output terminals not shorted out), the third switch is set to be open (i.e., isolating the test current source 240 from the current supply node $N_C$, and the fourth switch is set to be closed (i.e., connecting the drive current supply 235 to the current supply node $N_C$) (1120). This will provide an effective circuit configuration as shown in FIG. 10. In the disclosed embodiment, this operation can be performed by sending the appropriate fire enable signal, test enable signal, test selection signal, and continuity enable signal from the logic and timer circuit 280.

Once the switches are properly set for the airbag deployment mode, the drive current $I_{DRIVE}$ is provided to the gate of the firing FET 220 (1130), turning on the firing FET 220.

With the firing FET 220 turned on, the fire current $I_{FIRE}$ is provided the squib 120, causing it to fire (1140).

The firing of the squib 120 then causes the air bag 130 to be deployed in the vehicle (1150).

As noted above, when the FET testing process 500, the drive-current-testing process 700, and the fire-current-testing process 900 are all successfully performed, the deployment of the airbag 130 when a crash is detected can be achieved with a great deal of certainty. This is because during the FET-testing process 500 it was determined that the firing FET 220 was operating properly, during the drive-current-testing process 700 it was determined that the drive current $I_{DRIVE}$ was of a sufficient value to turn on the firing FET 220, and during the fire-current-testing process 900 it was determined that the fire current $I_{FIRE}$ was of a sufficient value to set off the squib 120.

Alternate Embodiments

Figure 12:
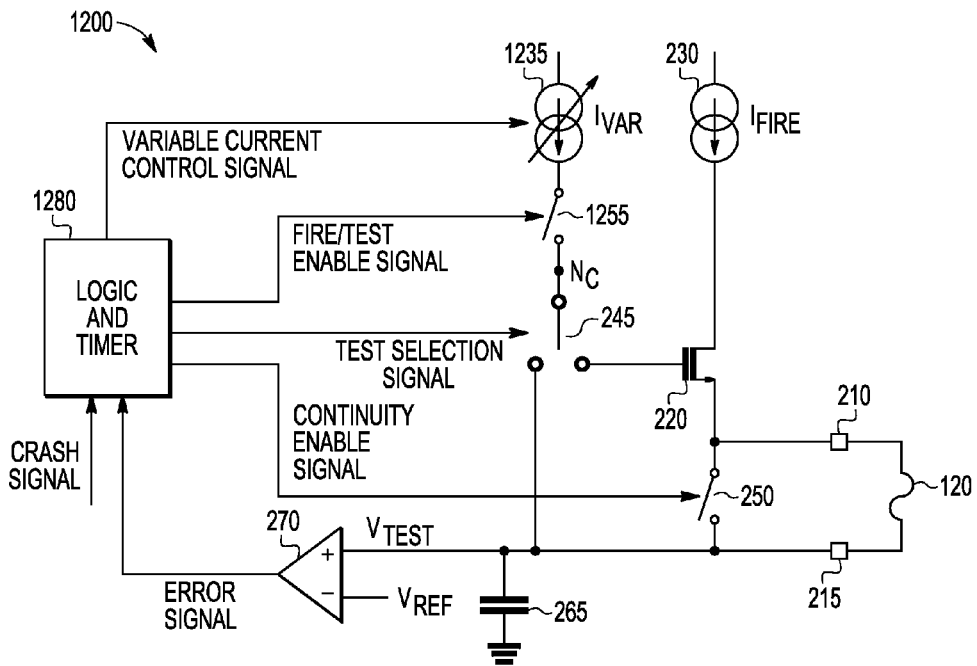
FIG. 12 is a circuit diagram of a test/control circuit according to other disclosed embodiments.

FIG. 12 is a circuit diagram of a test/control circuit 1200 according to other disclosed embodiments. The test/control circuit 1200 of FIG. 12 is similar to the test/control circuit 110 except that the test current supply 235 and the drive current supply 240 have been replaced with a variable current supply 1235, and the third and fourth switches 255, 260 have been replaced with a fifth switch 1255. In addition instead of generating a fire enable signal and a test enable signal, the logic and timer 1280 generates a fire/test enable signal and a variable current control signal.

As shown in FIG. 12, the test/control circuit 1200 includes a first output terminal 210, a second output terminal 215, a firing FET 220, a fire current source 230, a variable current source 1235, a first switch 245, a second switch 250, a fifth switch 1255, a capacitor 265, an error-detecting circuit 270, and a logic and timer circuit 1280. The test/control circuit 110 is connected to the squib 120 at the first and second output notes 210, 215.

The squib 120, first output terminal 210, second output terminal 215, a firing FET 220, fire current source 230, first switch 245, second switch 250, capacitor 265, and error-detecting circuit 270 all operate as described with respect to FIG. 2. As a result, the description of their operation will not be repeated here.

The variable current supply 1235 is configured to provide either a test current $I_{TEST}$ or a drive current $I_{DRIVE}$ to a first terminal of the fifth switch based on the variable current control signal. The test current $I_{TEST}$ is used in a testing operation of the test/control circuit 110, as will be described below, while the drive current $I_{DRIVE}$ should be sufficient to turn the firing FET 220 fully on, allowing the fire current $I_{FIRE}$ to pass to the squib 120. In the disclosed embodiments, the test current $I_{TEST}$ is a known current that is lower than the drive current $I_{DRIVE}$.

The fifth switch 1255 is a single pole, single throw switch that has its first terminal connected to the variable current source 1235, and its second terminal connected to the current supply node $N_C$. The fifth switch 1255 is opened and closed based on the fire/test enable signal.

The logic and timer circuit 1280 receives the error signal from the error-detecting circuit 270 and the crash signal from the crash determination element, and generates the variable current control signal, the fire/test enable signal, the test selection signal, and the continuity enable signal. The logic and timer circuit 1280 is capable of measuring time either through an internal clock or a received clock signal.

During the FET-test mode, the variable current control signal instructs the variable current supply 1235 to supply the test current $I_{TEST}$, while the fire/test enable signal instructs the fifth switch 1255 to be closed.

During the drive-current-test mode, the fire-current-test mode, and the airbag deployment mode, the variable current control signal instructs the variable current supply 1235 to supply the drive current $I_{DRIVE}$, while the fire/test enable signal instructs the fifth switch 1255 to be closed.

In this way, the circuitry of the test/control circuit 1200 can be simplified.

Figure 13:
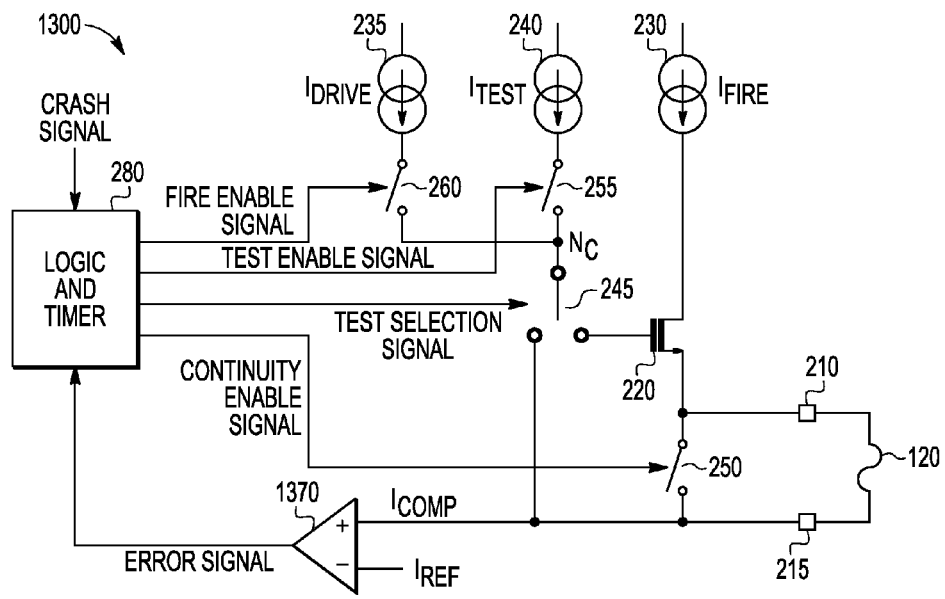
FIG. 13 is a circuit diagram of a test control circuit according to yet other disclosed embodiments.

FIG. 13 is a circuit diagram of a test/control circuit 1300 according to yet other disclosed embodiments. The test/control circuit 1300 of FIG. 13 error-detecting circuit 1370 is a current comparator that compares a testing current $I_{TEST}$ to a reference current $I_{REF}$. Furthermore, since currents are compared, there is no need for the capacitor 265.

As shown in FIG. 13, the test/control circuit 1300 includes a first output terminal 210, a second output terminal 215, a firing FET 220, a fire current source 230, a drive current source 235, a test current source 240, a first switch 245, a second switch 250, a third switch 255, a fourth switch 260, an error-detecting circuit 1370, and a logic and timer circuit 280. The test/control circuit 1300 is connected to the squib 120 at the first and second output notes 210, 215.

The squib 120, first output terminal 210, second output terminal 215, firing FET 220, fire current source 230, drive current source 235, test current source 240, first switch 245, second switch 250, third switch 255, fourth switch 260, and logic and timer circuit 280 all operate as described with respect to FIG. 2. As a result, the description of their operation will not be repeated here.

The error-detecting circuit 1370 is a current comparator that operates to compare a test current $C_{TEST}$ at a testing terminal with a reference current $C_{REF}$ at a reference terminal.

The testing terminal is connected to the second output terminal 215, while the reference terminal is connected to the reference current $C_{REF}$. The error-detecting circuit 1370 provides an error signal which indicates whether or not the test current $C_{TEST}$ exceeded the reference current $C_{REF}$. In this way, the test/control circuit 1300 need not provide any circuitry to convert currents to voltages, nor must it take such a conversion into account when calculating maximum times.

Figure 14:
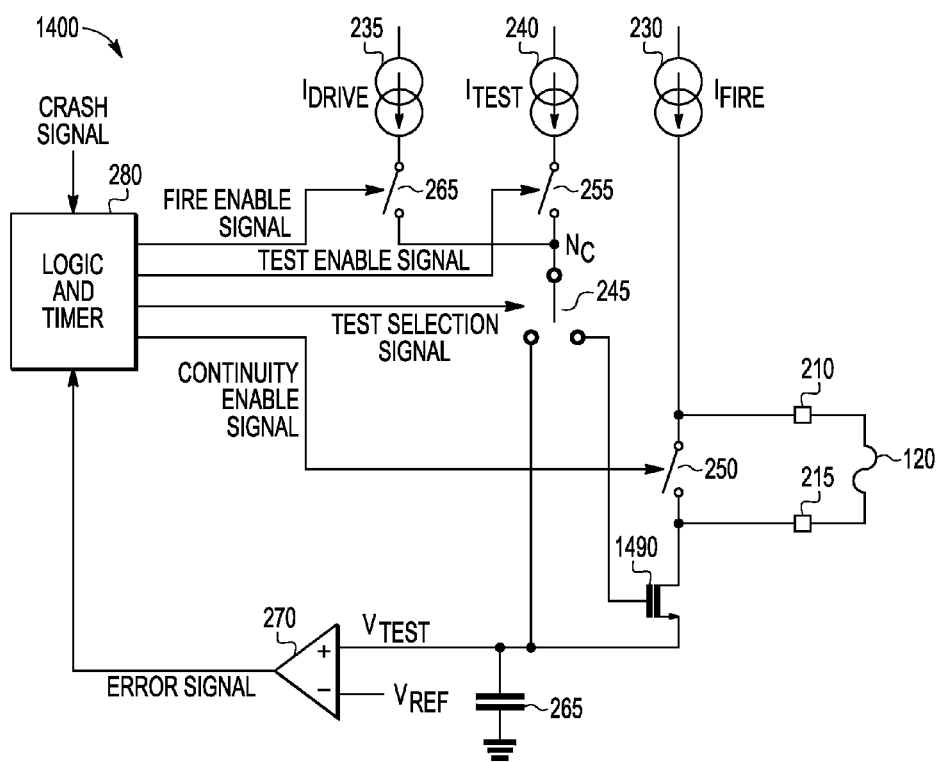
FIG. 14 is a circuit diagram of a test control circuit according to still other disclosed embodiments.

FIG. 14 is a circuit diagram of a test/control circuit 1400 according to still other disclosed embodiments. In particular, FIG. 14 depicts test/control circuit 1400 having both a high-side switch and a low-side switch.

As shown in FIG. 14, the test/control circuit 1400 includes a first output terminal 210, a second output terminal 215, a first firing FET 220, a second firing FET 1490, a fire current source 230, a drive current source 235, a test current source 240, a first switch 245, a second switch 250, a third switch 255, a fourth switch 260, a capacitor 265, an error-detecting circuit 270, and a logic and timer circuit 280. The test/control circuit 1400 is connected to the squib 120 at the first and second output notes 210, 215.

The squib 120, first output terminal 210, second output terminal 215, first firing FET 220, fire current source 230, drive current source 235, test current source 240, first switch 245, second switch 250, third switch 255, fourth switch 260, capacitor 265, error-detecting circuit 270, and logic and timer circuit 280 all operate as described with respect to FIG. 2. As a result, the description of their operation will not be repeated here.

The second firing FET 1490 operate in a manner similar to the first firing FET 220 and, respectively. However, where the first firing FET 220 is located between the fire current source 230 and the first output terminal 210, the second firing FET 1490 is located between the second output terminal 215 and the testing terminal of the error-detecting circuit 270.

The second firing FET 1490 has a source, a drain, and a gate. The drain of the second firing FET 1490 is connected to the second output terminals 215; the source of the second firing FET 1490 is connected to the testing terminal of the error-detecting circuit 270; and the gate of the second firing FET 1490 is connected to the gate of the first firing FET 220. Because the gates of the first and second firing FETs 220, 1490 are connected together, these two FETs are turned on and off at the same time.

In this disclosed embodiment, the firing FET 220 is an N-channel metal oxide semiconductor field-effect transistor (MOSFET), though other types of FET could be used in alternate embodiments. The firing FET 220 is used as a switch to provide the fire current $I_{FIRE}$ to the squib 120.

In this way, the second output terminal 215 can be isolated from the error-detecting circuit 270 and the capacitor 265 in the same way that the first output terminal 210 is isolated from the fire current source 230.

Final Comments

In the above description, the fire enable signal, the test enable signal, and the continuity enable signal are described as instructing the second, third, and fourth switches to be open or closed. In various embodiments these signals can actively instruct both opening and closing. However, in alternative embodiments, there can be a default position for the switch, and the respective signals can be applied only when the alternate position is required. For example the switches could default to be open position, and a signal may be provided when the switches are to be placed in the closed position. In some embodiments the default positions can be set to be what they should be in the operational mode, allowing a default mode to be the operational mode.

Also, although the above disclosures are made using a firing FET that is an N-channel MOSFET device, this is by way of example only. Alternate embodiments could use a P-channel MOSFET, a different kind of FET, or even a bipolar transistor. Any transistor that can serve as a switch between the squib and the firing current $I_{FIRE}$ can be used in various embodiments.

In addition, although in the various embodiments described above, the time that a current is applied to the capacitor 265 is varied such that the test voltage $V_{TEST}$ will become greater than or equal to a constant reference voltage $V_{REF}$ for a successful test, alternate embodiments could use a constant time for providing a current to the capacitor 265 and vary the reference voltage $V_{REF}$ accordingly. In each case, one of the variables in Equation (3) is kept constant while another is varied.

Conclusion

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A driving current diagnostic circuit, comprising:
   a field-effect transistor (FET) having a source connected to a first output node, a drain connected to a supply node, and a gate;
   a first switch configured to selectively connect a current supply node to one of the gate of the FET and a test node;
   a second switch connected between the first output node and a second output node;
   a test and drive current source configured to selectively provide one of a drive current and a test current to the current supply node;
   a fire current source configured to provide a fire current to one of the supply node and the second output node;
   an error-detecting circuit connected to the test node, a reference terminal, and an error node, the error-detecting circuit being configured to generated an error signal to the error node that indicates whether a value of an error-detecting parameter at the test node exceeds a value of a reference parameter at the reference terminal; and
   a control circuit configured to generate control signals to control operation of the test and drive current source, the first switch, and the second switch,
   wherein
   a one of the supply node and the second output node, which is not connected to the fire current source, is connected to a ground voltage,
   the test node is connected to the ground voltage.

2. The driving current diagnostic circuit of claim 1, wherein
   the test and drive current source is a variable current source capable of producing the test current and the drive current.

3. The driving current diagnostic circuit of claim 1, wherein the test and drive current source comprises:
   a test current source configured to provide the test current;
   a third switch connected between the test current source and the current supply node
   a drive current source configured to provide the drive current; and
   a fourth switch connected between the drive current source and the current supply node.

4. The driving current diagnostic circuit of claim 1, further comprising:
   a capacitor having a capacitance value,
   wherein
   the test node and the one of the supply node and the second output node that is not connected to the fire current source are connected to the ground voltage through the capacitor,
   the error-detecting circuit is a voltage comparator,
   the error-detecting parameter is an error-detecting voltage, and
   the reference parameter is a reference voltage.

5. The driving current diagnostic circuit of claim 4, wherein
   the control signals include a test enable signal that instructs the test and drive current source to provide the test current to current supply node, and a first test selection signal that controls the operation of the first switch,
   the control circuit is configured to provide the test current activation signal, and the first test selection signal, for a FET-testing duration during a test of the FET,
   the first switch is configured to connect the current supply node to the gate of the FET in response to the first test selection signal,
   the capacitance value and the first duration are set such that the capacitance value multiplied by the reference voltage is proportional to a drain-source current of the FET over a FET-testing duration, and
   the first duration is less than the turn-on time for the FET.

6. The driving current diagnostic circuit of claim 5, wherein a drain-source current of the FET at the end of the FET duration is less than a dudding current for a squib connected between the first and second output nodes.

7. The driving current diagnostic circuit of claim 5, wherein
   the control signals include a drive current activation signal that instructs the test and drive current source to provide the drive current to the gate of the FET,
   the control circuit is configured to provide the drive current activation signal, and a second test selection signal, for a drive-current-testing duration during a test of the gate drive current,
   the first switch is configured to connect the current supply node to the second output node in response to the second test selection signal, and
   the drive-current-testing duration is set such that the capacitance multiplied by the reference voltage is equal to the drive-current-testing duration multiplied by a minimum acceptable drive current.

8. The driving current diagnostic circuit of claim 7, wherein
the control signals include a continuity enable signal that controls the operation of the second switch,
the control circuit is configured to provide the drive current activation signal, the first test selection signal, and the continuity enable signal for a fire-current-testing duration during a test of the fire current,
the second switch is configured to be closed in response to the continuity enable signal, and
the fire-current-testing duration is set such that the capacitance multiplied by the reference voltage is equal to the fire-current-testing duration multiplied by a minimum acceptable fire current after the FET has turned on.

9. The driving current diagnostic circuit of claim 8, wherein
the driving current diagnostic circuit is part of an airbag deployment system in a vehicle,
the control circuit is configured to receive a crash signal, indicating that the vehicle has been in a crash,
the control circuit is configured to provide the drive current activation signal and the first test selection signal for an activation duration after it receives the crash signal, and
the activation duration is longer than the activation time of the FET.

10. The driving current diagnostic circuit of claim 1, wherein
the error-detecting circuit is a current comparator,
the error-detecting parameter is an error-detecting current, and
the reference parameter is a reference current.

11. An air bag deployment system for a vehicle, comprising:
a squib configured to fire when it receives a fire current;
an undeployed air bag configured to deploy when the squib fires; and
a fire current supply circuit, including
a field-effect transistor (FET) having a source connected to a first output node, a drain connected to a supply node, and a gate;
a first switch configured to selectively connect a current supply node to one of the gate of the FET and a test node;
a second switch connected between the first output node and a second output node;
a test and drive current source configured to selectively provide one of a drive current and a test current to the current supply node;
a fire current source configured to provide a fire current to one of the supply node and the second output node;
an error-detecting circuit connected to the test node, a reference terminal, and an error node, the error-detecting circuit being configured to generated an error signal to the error node that indicates whether a value of an error-detecting parameter at the test node exceeds a value of a reference parameter at the reference terminal; and
a control circuit configured to generate control signals to control operation of the test and drive current source, the first switch, and the second switch,
wherein
a one of the supply node and the second output node that is not connected to the fire current source is connected to a ground voltage,
the test node is connected to the ground voltage, and
the squib is connected between the first output node and the second output node.

12. The air bag deployment system of claim 11, wherein
the test and drive current source is a variable current source capable of producing the test current and the drive current.

13. The air bag deployment system of claim 11, wherein the test and drive current source comprises:
a test current source configured to provide the test current;
a third switch connected between the test current source and the current supply node, the third switch being a single pole, single throw switch;
a drive current source configured to provide the drive current; and
a fourth switch connected between the drive current source and the current supply node, the fourth switch being a single pole, single throw switch.

14. The air bag deployment system of claim 11, further comprising:
a capacitor having a capacitance value,
wherein
the test node and the one of the supply node and the second output node that is not connected to the fire current source are connected to the ground voltage through the capacitor,
the error-detecting circuit is a voltage comparator,
the error-detecting parameter is an error-detecting voltage, and
the reference parameter is a reference voltage.

15. The air bag deployment system of claim 14, wherein
the control signals include a test enable signal that instructs the test and drive current source to provide the test current to current supply node, and a first test selection signal that controls the operation of the first switch,
the control circuit is configured to provide the test current activation signal, and the first test selection signal, for a FET-testing duration during a test of the FET,
the first switch is configured to connect the current supply node to the gate of the FET in response to the first test selection signal,
the capacitance value and the first duration are set such that the capacitance value multiplied by the reference voltage is proportional to a drain-source current of the FET over a FET-testing duration, and
the first duration is less than the turn-on time for the FET.

16. The air bag deployment system of claim 15, wherein
the control signals include a drive current activation signal that instructs the test and drive current source to provide the drive current to the gate of the FET, and a continuity enable signal that controls the operation of the second switch,
the control circuit is configured to provide the drive current activation signal, the test selection signal, and the continuity enable signal for a second duration during a test of the gate drive current,
during the second duration, the test selection signal instructs the first switch to connect the current supply node to the second output node, and the continuity enable signal instructs the second switch to be closed, and
the second duration is set such that the capacitance multiplied by the reference voltage is equal to the second duration multiplied by a minimum acceptable drive current.

17. A method of testing and operating a squib detonation circuit for an air bag system in a vehicle, the circuit containing first and second squib connectors configured to connect to a squib, and a field effect transistor (FET) connected at its drain to a supply node and at its source to the first squib connector, the method comprising:
- connecting the squib to the first and second squib connectors during a first duration;
- providing a test current to a gate of the FET during the first duration;
- determining whether a first error-detecting parameter at a test node is greater than a reference parameter at the end of the first duration; and
- sending a first error signal indicating failure of the FET if the first error-detecting parameter at the second squib connector is not determined to be greater than the reference parameter at the end of the first duration;
- providing a drive current to the second squib connector during a second duration;
- determining whether a second error-detecting parameter at the second squib connector is greater than the reference parameter at the end of the second duration; and
- sending a second error signal indicating failure of a drive current source if the second error-detecting parameter at the second squib connector is not determined to be greater than the reference parameter at the end of the second duration,
- wherein
- one of the supply node and the second squib connector is connected to a fire current supply,
- a one of the supply node and the second squib connector that is not connected to the fire current supply is connected to a ground voltage,
- the test node is connected to the ground voltage, and
- the first duration is shorter than the turn-on time of the FET.

18. The method of claim 17, further comprising:
- placing the first and second squib connectors in an unconnected state during a third duration;
- providing the drive current to the gate of the FET during the third duration;
- electrically connecting the first squib connector and the second squib connector during the third duration;
- determining whether a third error-detecting parameter at the second squib connector is greater than the reference parameter at the end of the third duration; and
- sending a third error signal indicating failure of the fire current source if the third error-detecting parameter at the second squib connector is not determined to be greater than the reference parameter at the end of the third duration,
- wherein the third duration is greater than or equal to the activation time of the FET.

19. The method of claim 17, wherein
- the first error-detecting parameter is a first error-detecting voltage,
- the second error-detecting parameter is a second error-detecting voltage, and
- the reference parameter is a reference voltage.

20. The method of claim 17, wherein
- the first error-detecting parameter is a first error-detecting current,
- the second error-detecting parameter is a second error-detecting current, and
- the reference parameter is a reference current.

* * * * *